United States Patent [19]

Palmer

[11] Patent Number: 4,982,530
[45] Date of Patent: Jan. 8, 1991

[54] EXTRUDED CORE SECTIONS FOR WOOD FENESTRATION MOUNTING FRAMES AND SASHES

[75] Inventor: Douglas J. Palmer, Mosinee, Wis.

[73] Assignee: SNE Enterprises, Inc., New York, N.Y.

[21] Appl. No.: 257,769

[22] Filed: Oct. 14, 1988

[51] Int. Cl.$^5$ .............................................. E06B 1/04
[52] U.S. Cl. ........................................ 49/504; 52/211; 49/501
[58] Field of Search ..................... 49/504, 501; 52/212, 52/211, 730, 732

[56] References Cited

U.S. PATENT DOCUMENTS

| | | | |
|---|---|---|---|
| 3,694,961 | 10/1972 | Johnson | 49/505 |
| 4,207,707 | 6/1980 | Holdiman | 49/504 |
| 4,344,257 | 8/1982 | Anderson | 49/504 |
| 4,495,726 | 1/1985 | Lindström | 49/DIG. 1 |
| 4,640,054 | 2/1987 | Bremeier | 49/504 |
| 4,686,805 | 8/1987 | Forslin | 49/DIG. 1 |

FOREIGN PATENT DOCUMENTS 0386089 4/1965 Switzerland .......................... 52/212

Primary Examiner—Kenneth J. Dorner
Assistant Examiner—Gerald A. Anderson
Attorney, Agent, or Firm—Hill, Van Santen, Steadman & Simpson

[57] ABSTRACT

There is disclosed herein a fenestration for a building having a fenestration-securing opening cut therein. The fenestration includes a mounting frame assembly for fitting within the opening and a glazed sash carried in the mounting frame. The mounting frame and the sash each includes an extruded I-beam-like shaped core portion. The mounting frame core is constructed for securement to (a) an interior frame part, (b) exterior brick moulding or extrustion, (c) a sash weatherstripping and (d) a building flashing or seal. The sash core is an I-beam-like shaped extruded core having an interior member, exterior member, and glazing grasping portions. This construction permits the selective and flexible use of clear, finished, primed, unprimed, painted, stained, clad, etc., interior or exterior members and minimizes storage and inventory problems.

13 Claims, 5 Drawing Sheets

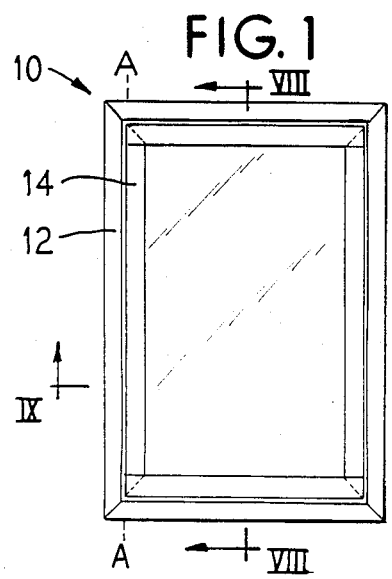
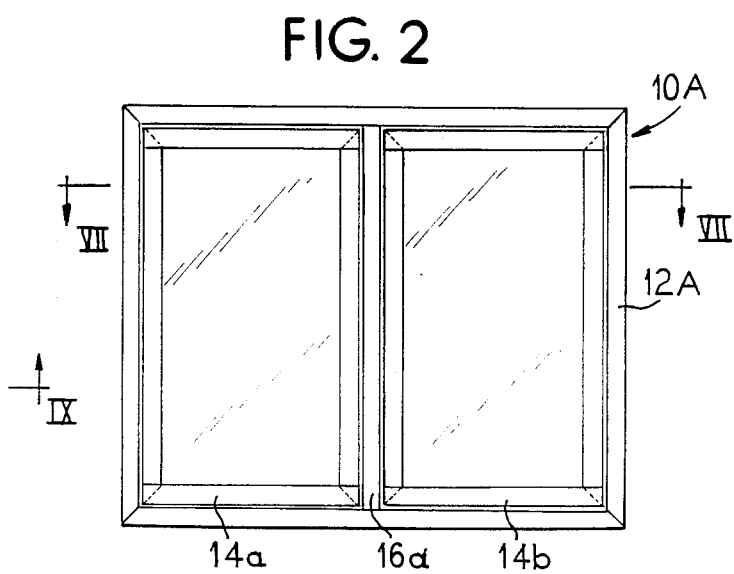
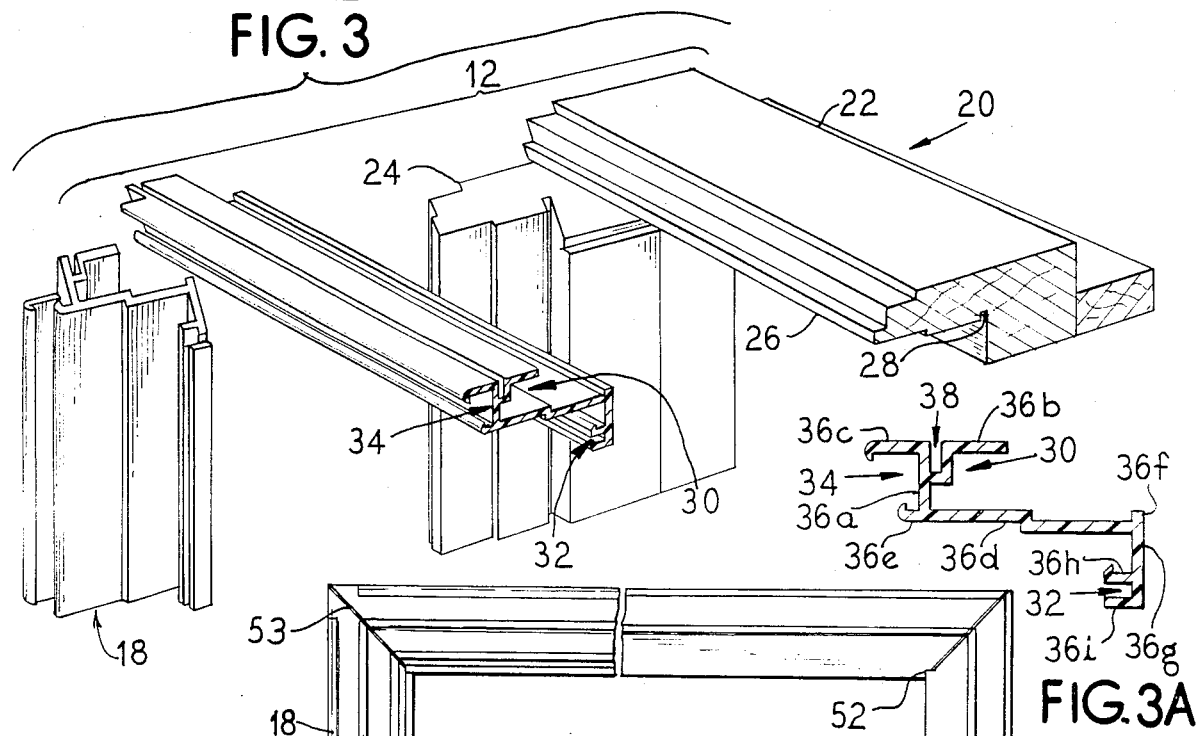
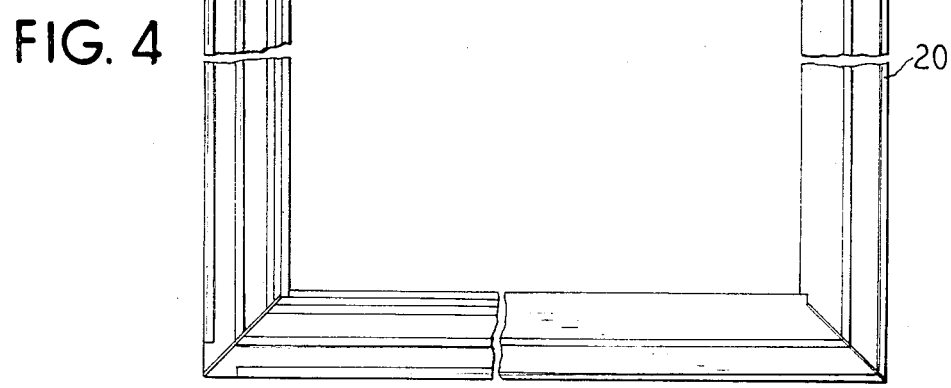

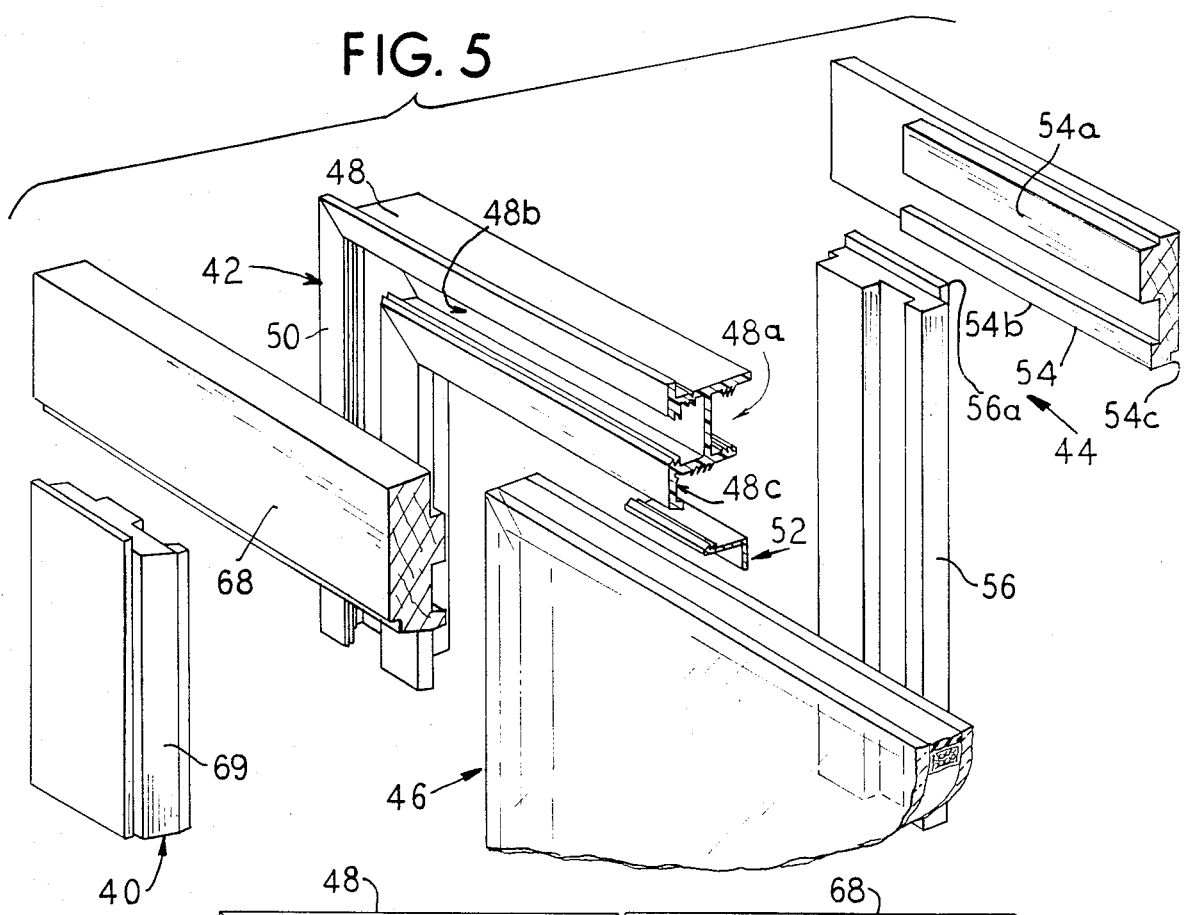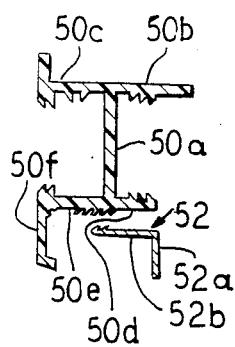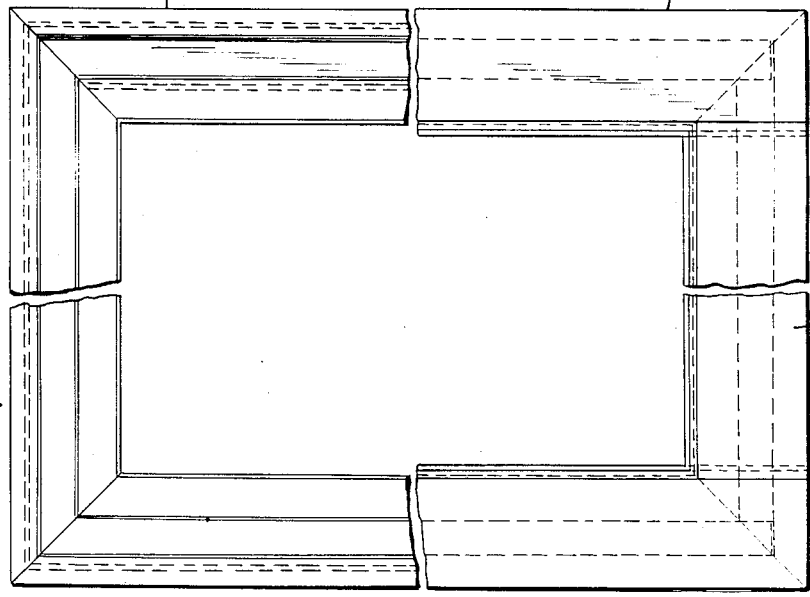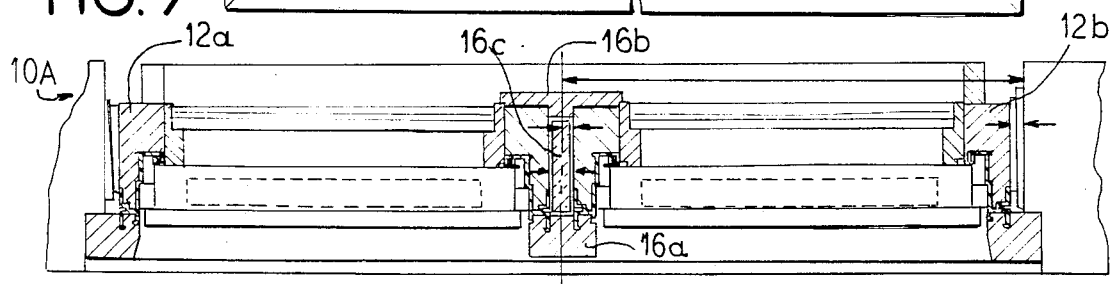

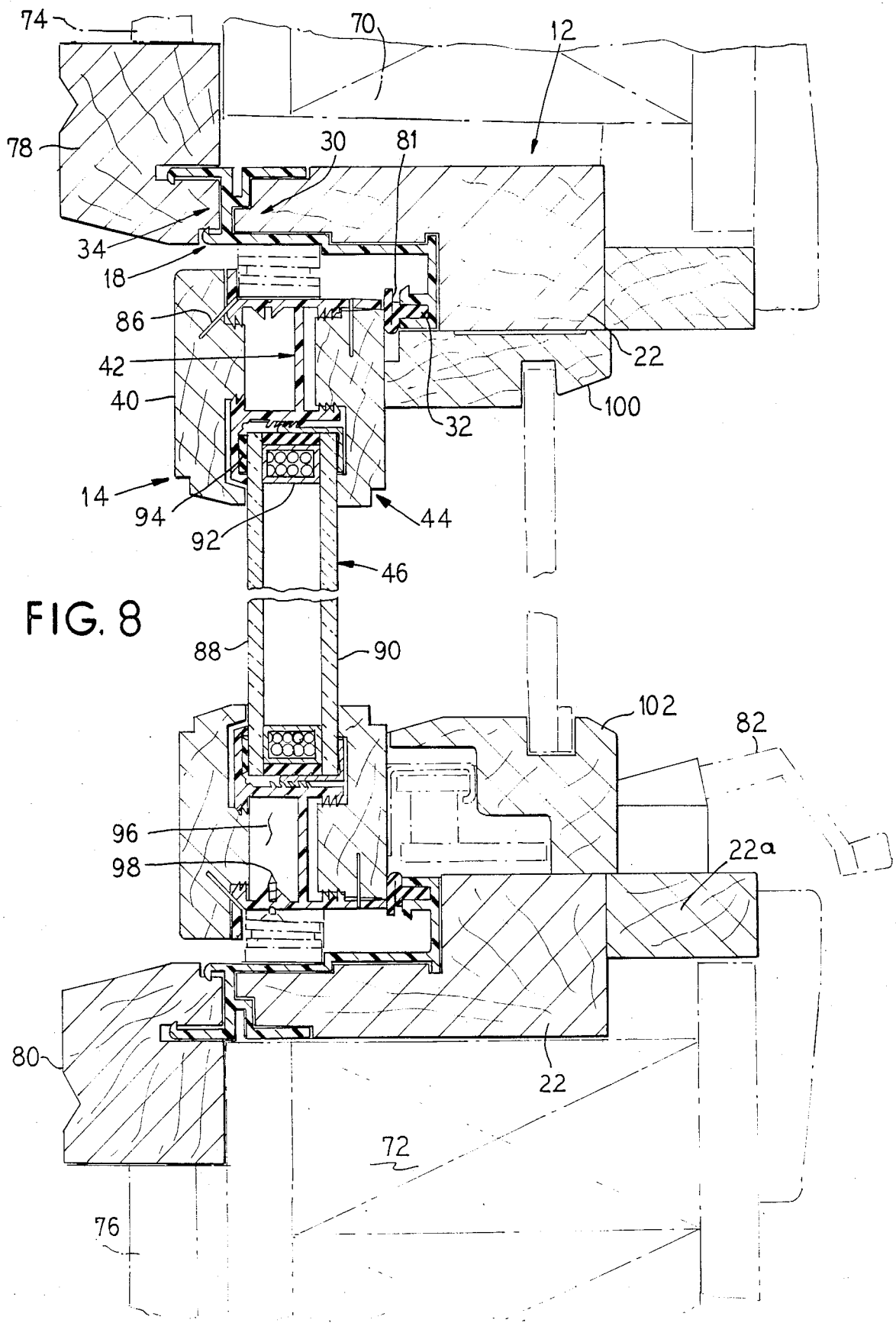

EXTRUDED CORE SECTIONS FOR WOOD FENESTRATION MOUNTING FRAMES AND SASHES

BACKGROUND OF THE INVENTION

This invention relates to a fenestration construction, usually a window or a door, and more particularly, to a construction wherein the window can be selectively provided with a wood, vinyl, or aluminum appearance.

Fenestration refers to the arrangement, positioning and design of windows and doors in a building. Both windows and doors include a frame assembly for mounting in the building opening and a glazed sash assembly carried in the mounting frame assembly. Usually the sash assembly is movable with respect to the mounting frame assembly between closed and open positions. The movable sash assembly pivots in a casement or awning style window or slides in a double hung window or sliding door.

The mounting frame assembly and the sash assembly each include a frame that has been fabricated from wood members—namely, head, sill and jamb members. A generally transparent pane, usually glass, is fitted into the sash and counterweights, hinges, etc., are provided as necessary. Wooden brick moulding, vinyl or metal nailing fin are provided for securement to the mounting frame assembly to cover the space or interface between the mounting frame assembly and the building opening.

In some cases the customer orders windows with stained, primed or unprimed interior members. The exterior members can be stained, primed, unprimed, vinyl or aluminum clad. Cladding is usually bonded onto preformed base members and is intended to match the building exterior.

In order to manufacture these windows and doors, a large number of separate member parts are required as the head, sill and side members are generally uniquely shaped, of different lengths, and different finishes can be required for different applications.

It is therefore an object of this invention to minimize the number of different parts required to be manufactured and to be kept in inventory for windows and doors.

It is usually desirable to provide fully wooden interior surfaces which have been stained, primed or unprimed. It is also desirable to sometimes provide a clad exterior or a stained, primed or unprimed exterior. For example, a primed pine interior and a clad exterior may be requested. Another combination may be an oak interior and a cedar exterior. In this case, the shapes of the various parts are the same, but the wood or clad materials are different.

It is another object to provide a system or construction in which the desired finishes and combinations thereof can be easily and readily provided.

In devising a door or window construction, it is desirable to maximize the performance of the window or door by, inter alia, minimizing thermal conductivity therethrough.

It is therefore another object of this invention to provide a window construction in which performance is maximized.

In mull installations, window units are usually butted side-by-side against each other. Current window installation requires that a 28-inch building opening is cut for each 27½-inch window. Thus, a 55½-inch opening is cut for two 27½-inch windows, etc. Thus, opening/window unit side spacing for a single unit may be one-half inch, one inch, etc. When assembling multiple units, it is seen that the end clearance or gap with the building will get larger.

It is another object to provide a construction in which the clearance or gap remains essentially the same regardless of the number of units.

These and other objects of this invention will become apparent from the following disclosure and appended claims.

SUMMARY OF THE INVENTION

The invention herein meets the objects set out hereinbefore of providing standardized parts, permitting mixing and matching of interior and exterior materials, maximizing performance, and providing for equal spacing of assemblies. More specifically, both the mounting frame assembly and the sash include a core or foundation extrusion to which interior and exterior parts are selectively securable. The mounting frame and sash cores differ in cross-section from each other, but each core is substantially identical on all four of its sides.

In addition, standardized interior and exterior parts, such as head, sill and side members, are secured to the extrusions. These parts are similar in section but different in length. This feature provides for standardization and interchangeability so as to minimize the inventory and machining omit required.

The units are constructed so as to minimize thermal conductivity between the interior and exterior so as to maximize performance.

A mullion is provided for vertical positioning between window units and securement to the extrusions so as to horizontally space the units and provide a uniform clearance or gap between the building opening and the side ends of the ganged multiple window units.

More specifically, the mounting frame assembly includes a rectangular frame having an I-beam-like extrusion forming a core or foundation shaped so that the interior and exterior frame parts can be secured thereto and to which exterior brick moulding and mullions can be secured.

The sash includes a rectangular frame having an I-beam-shaped extrusion that forms the core or foundation to which a glass pane can be mounted and to which interior parts and exterior parts can be secured.

The construction assures that the peripheral edges of the pane are embedded within the sash so as to minimize thermal conductivity. The extrusion also defines an embedded box-shaped insulating section about the peripheral edges of the pane which is either a dead air space or insulation filled for further maximizing performance.

With this construction different parts with different finishes can be stored and secured to the core extrusions as ordered or desired, while maximizing flexibility and performance and minimizing storage and inventory.

Each of the extrusions are provided with flanges and webs which are shaped and dimensioned to permit them to engage, usually with a snap-lock action, the various interior and exterior parts as they have been appropriately shaped or cut.

BRIEF DESCRIPTION OF THE DRAWINGS

FIG. 1 is an elevational view of a pivoting or casement style window;

FIG. 2 is an elevational view of a pair of ganged or side-by-side pivoting or casement-style windows;

FIG. 3 is an exploded perspective style view of members of a mounting frame;

FIG. 3A is a cross-sectional view of the extruded core of FIG. 3;

FIG. 4 is an elevational view of a mounting frame on one side and one part of the extruded core on the other side;

FIG. 5 is an exploded perspective and fragmentary-style view of members of a glazed sash;

FIG. 5A is a cross-sectional view of the extruded core of FIG. 5;

FIG. 6 is an elevational view of a sash on one side and one part of the extruded core on the other; FIG. 7 is a horizontal sectional view taken along line VII—VII of FIG. 2 showing a ganged window;

FIG. 8 is a detailed sectional view taken along line VIII—VIII of FIG. 1 showing a casement-style window in vertical section;

DESCRIPTION OF THE PREFERRED EMBODIMENT

I. General

Figure 9:
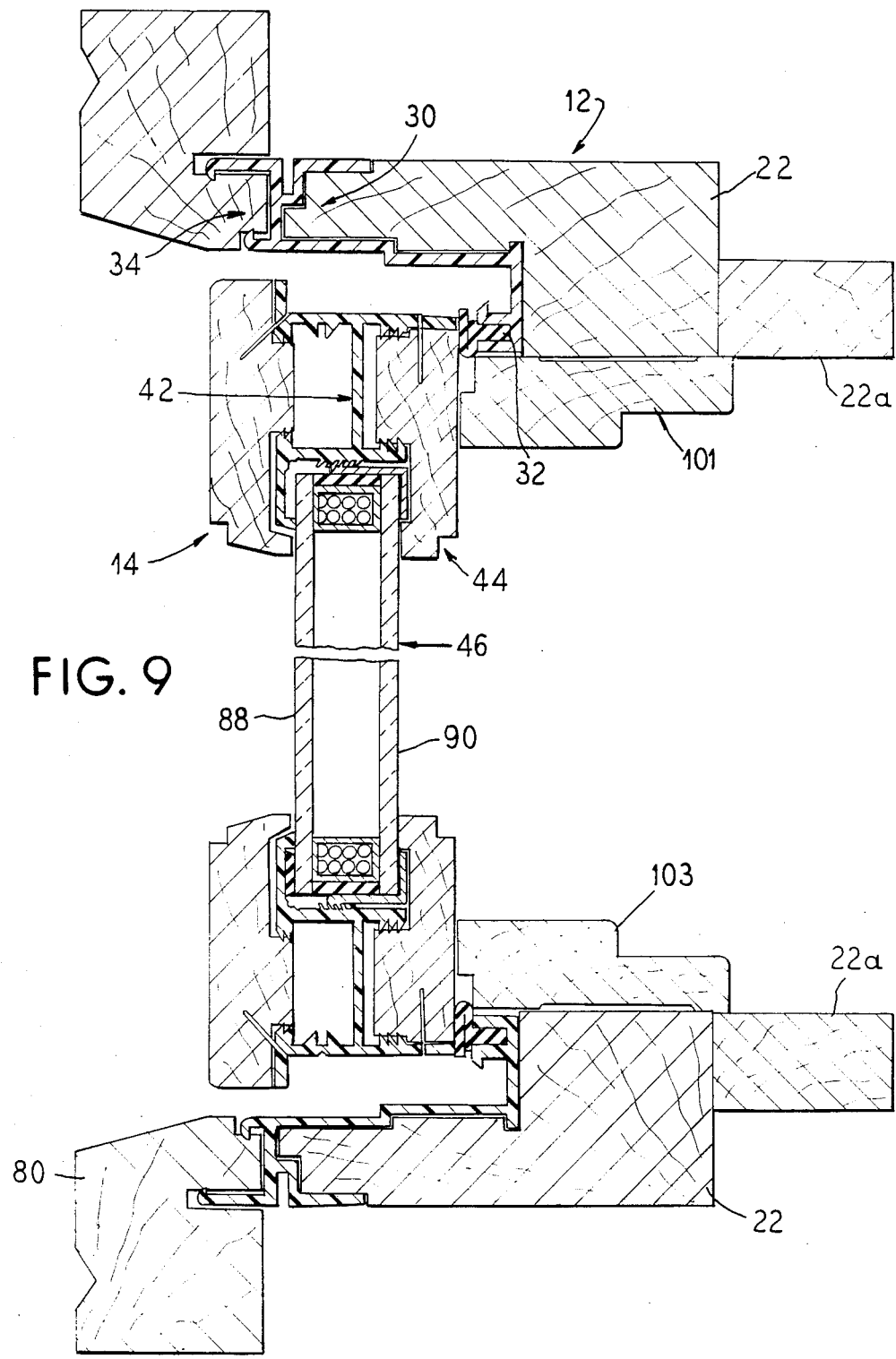
FIG. 9 is a detailed sectional view taken along line IX—IX of FIG. 1 showing a casement-style window in horizontal section.

The embodiment herein generally relates to a casement window which is a pivotably opening window that is usually mounted for rotation about a vertical axis or can be mounted for rotation about a horizontal axis in which case the window is called an awning-type window. The invention herein can also be used in the typical double-hung window wherein two glazed sashes are arranged to move slidingly past one another. That sliding system can be arranged to move in a horizontal direction so as to provide a sliding glass window or door. The system disclosed herein can be used in a fixed window or door structure.

Referring first to FIGS. 1 and 2, there is shown a window assembly 10 generally, which includes a mounting frame 12 generally, which is constructed to be mounted in the opening of a building and which carries therewithin a glazed sash assembly 14 generally. The glazed sash assembly in this particular embodiment is arranged for vertical rotation about an axis A—A along the left-hand side of the sash.

Referring now to FIG. 2, there is a mounting window assembly 10a, which includes a mounting frame 12a which carries therewithin a pair of vertically pivotable glazed sash assemblies 14a and 14b and a central spacer mullion 16a.

II. Mounting Frame

Referring now to FIGS. 3, 3A and 4, there is shown a mounting frame, such as 12, which includes an extruded core or foundation section 18 generally and an interior finishing member 20 generally. The frame includes a top horizontal portion or head portion, a bottom horizontal or sill portion, and vertical side or jamb portion. In this case there is more specifically shown a head portion (sometimes interior or framing member) and a jamb portion 22 and 24, respectively. It is noted that the extrusion and the head or jamb members are mitred so as to form 45° corners except for a small interior step formed therein that is square cut or abutting. The head, sill and jamb members of the interior members and the extrusions are essentially identical in cross-section but differ in length.

As is seen in FIG. 3, the exterior side of the head, sill or jamb portion, such as 26, is step-shaped so as to receive and be secured to the complementary extrusion, such as 18. Specifically, it is to be noted that the head includes a recess 28 for snappingly locking engagement of the extrusion so as to hold the extrusion against the interior member. As a matter of convenience, the head and jamb portions may be formed of two pieces.

The extrusions, such as 18, include or define at least three separate or functional sections. These are the interior or framing member grasping section 30, the sash seal retaining section 32, and the exterior member or brick moulding grasping section 34. The extrusion can be viewed as having an exaggerated I-beam-like shape. The terms "inner periphery" and "outer periphery" are used hereinafter in connection with the frame and extrusion and refer to the inner periphery of the frame and outer periphery of the frame. This usage is to be separate from the term "exterior" that refers to the weather or outer side of a window and "interior" that refers to the building or inside of the window.

In detail, the mounting frame core includes the I-beam-like section having a central web 36a. Outer periphery interior and exterior flanges 36b and 36c and inner periphery interior and exterior flanges 36d and 36e are integral with the web 36a. The inner periphery interior flange terminates in a tab-like flange having outwardly and inwardly extending portions 36f and 36g. The inwardly extending part 36g has a pair of exterior extending legs 36h and 36i. The flange 36c terminates in an inwardly extending finger. The flange 36e is shorter than flange 36c and terminates in an outwardly extending finger. The flange 36d is elongated and step shaped. The flange 36b is also step shaped and cooperates in defining a flashing receiving groove 38 with the web 36a. The exterior member receiving section 34 is defined by the flange 36c, web 36a and flange 36e. The interior member receiving section 30 is defined by the flange 36b, the web 36a and the flange 36d. The seal receiving section is defined by the legs 36h and 36i and tab 36g.

The extrusion 18 is secured to the interior member 22 by virtue of the snap-fit of the pieces or by gluing and snapping the pieces together. In assembling the frame, it has been found that it is more practical to first join the extrusion and members into a single piece and then mitre the connections and provide a small step or abutting face onto the inner edge therein. The step is best seen in FIG. 4 and is referred to with numeral 52. But this edge can also be seen in FIG. 3. In other words, the extrusion is secured to the interior member and then the appropriate mitred and stepped joint is formed. In this way an interlocking and strong joint is formed at all four corners of the frame. This is sometimes referred to as a walkaround frame, and it is seen that the step edge is formed at each one of the four corners.

FIG. 4 shows on the right-hand side the interior wooden frame part. The interior wooden part with the extrusion is shown in FIG. 4 on the left-hand side. It is seen in FIG. 4 that all four corners are mitred and stepped. When this member is assembled, a thin gasketlike member 53 is secured at the corners, and the corners can be secured by an adhesive or by nailing.

It is seen that numerous different types of interiors can be secured to the extrusion. For example, the interiors may be primed, unprimed, pine, redwood, oak, etc., and they can all be shaped in the same way and secured to the same style of extrusion.

The extrusion is preferably an exterior grade rigid vinyl plastic, although the same may be an aluminum extrusion. Plastic is the preferred material.

III. Glazed Sash Assembly

A glazed sash assembly is shown in FIG. 5. There the assembly includes four main parts. Those are the exterior members 40 generally, the extruded core parts 42 generally, the interior members 44 generally, and the glazing 46 generally. As can be seen, the extruded member 42 forms a core or frame onto which the interior members are snapped and to which the exterior members are snapped. The frame also cooperates in securing and positioning the insulated glass assembly 46 which may also be a single or triple pane of glass.

The core or sash extrusion 42 is made of four fabricated lengths which form a rectangular frame such as the head portion 48 and a stile or side member 50. The various extrusion members all have the same cross-sectional shape but are of differing lengths as is appropriate. It is noted that the corners of the sash member are mitred, i.e., cut at 45° and the member is a plastic so that the members can be heat-fused together.

The sash core forms three basic sections—one being the interior member receiving section 48a, the second is the exterior member grasping section 48b, and the third is the glass receiving section 48c.

In section, FIG. 5A, it is seen that the extrusion has an I-beam-like shape with a central web 50a and a series of flanges to form the sections identified above. As used before, the terms "inner" and "outer" refer to the frame periphery, while "interior" and "exterior" refer to the building and weather side of the window assembly. The extrusion includes outer interior and exterior flanges 50b and 50c. The core also includes inner interior 50d and exterior flanges 50e. The flanges also carry ratchet-like grasping teeth as appropriate. The exterior flanges terminate in wall-like constructions, and the inner exterior flange 50e carries a downwardly depending wall section 50f. A glass grasping L-shaped clip 52 having legs 52a and 52b is provided for cooperation in locking the glass pane 46 in position. It is noted that leg 52b carries teeth for engaging teeth on the core inner flanges.

More specifically, (a) flange 50b, web 50a and flange 50d make up the interior member grasping section; (b) flange 50c, web 50a and flange 50e make up the exterior member flange grasping section; and (c) the glass grasping section is made up of wall 50f, flange 50e, flange 50d, clip leg 52b and clip leg 52a.

In assembly, the glass member 46 is placed in position against the inside of core wall 50f and then a series of clips, such as 52, are pushed into place so as to lock or hold the insulated glass member in place. It is noted that the clips include ratchet-like teeth along its top edge, which engage ratchet-like teeth provided in the core along the interior flange.

The interior members include a head member, such as 54, and sill member and side or stile member, such as 56. The head, sill and stile members all have basically the same cross-section, which includes an outer shoulder, such as 54a, and an inner shoulder 54b. In the case of the head and sill members, the shoulders are terminated prior to the end of the head or sill member so as to provide space for interfitting with the stile member. A small groove 54c is provided at the inner interior surface of the head and sill member for receiving a stile tab.

Referring to the stile, it is essentially the same as the head or sill member and includes a shoulder for snappingly engaging the core, the shoulder member for positioning against the window, and a small tab portion 56a at the upper and lower edges, which interfits in the groove 54c. The abutment and termination of the shoulder member 54 is to permit some latitude in the positioning of the parts. It is to be noted that when these parts are fitted together, they are fitted with a right-angle or abutment connection rather than a mitred connection.

The interior members, such as 54 and 56, may be provided selectively in a clear unfinished wood or a stained wood such as a pine, redwood, oak or maple. A larger number of choices of different materials are available, and since the stiles on both sides are similar to the head and sill, the top and bottom are both the same and fewer parts need to be stocked in inventory and a greater selection is achieved.

The exterior members 40 and head and stile, such as 68 and 69, may be provided with a clad vinyl surface finish, an aluminum surface finish, a primed finish, an unprimed finish or any of a group of selected choices. Thus it can be seen that in windows of this construction numerous interior selections can be made so as to match interior decorations and numerous different exterior parts can be selected so as to match exterior selections. Again, the exterior parts are reduced to two separate parts, the head and sill members, and the two sides are stile members.

Referring to FIG. 6, the right-hand portion thereof shows the frame with the exterior members mounted thereon and showing also in hidden lines the core and the various shoulders for snap-locking. On the left-hand side, the positioning of the core member without the exterior members is shown. The right-hand side is intended to show a mitred corner of those parts and how the interior and exterior parts snap-lock therein.

IV. Installation Views

In FIGS. 8 and 9, sectional views of a casement window of the type shown in FIG. 1 are shown.

Referring first to FIG. 8, the opening in a house is defined by the framing members generally defined as 70 and 72, which define the upper and lower framing sections. Siding members are shown as members 74 and 76. In assembly, the frame 12 generally, is fitted into the opening. The frame 12 here is seen as including the framing members 22 and having the framing extrusion 18 mounted thereto. From the view, it is seen that the extrusion is secured to the frame member 22 and defines the frame receiving section 30, a brick moulding section 34 and a weatherstrip engaging section 32. As is seen, a brick moulding, such as 78 and 80, is grooved on the interior face and snap-locked onto the extrusion 18 so as to cover any space between the building and frame and provide the proper appearance.

A weatherstrip 81 is mounted in the groove 32 and totally surrounds the frame so as to define a rectangularly shaped seal having a single interface.

The sash 14 includes the exterior parts 40, the core 42, which is an extrusion, and the interior parts 44 as well as the glazing 46.

The sash is pivotably connected along two edges to the frame by hinges and an operator so as to permit it to swing between an open and closed positions in the frame. An operating system such as 82 is known in the art and is provided with a handcrank so as to cause the sash to swing in and out. Details of the handcrank are known to those skilled in the art.

As can be seen in FIG. 8, the glazed sash seats against the weatherstrip material so as to provide a seal between the sash and the mounting frame.

The interior and exterior sash members are held to the extrusion by small brads, such as 86, which extend through the extrusion and into the interior/exterior members.

In addition, it is seen that with respect to the glass, the insulated glass is made up of a pair of panes 88 and 90, which are spaced from one another by a spacer 92 and sealed in place. The spacer is in a sense covered by the extrusion and the interior and exterior wood members so as to in effect bury the spacer in wood so as to minimize heat transfer caused by the spacer member. A perimeter bead of silicon-type sealing material 94 is used to hold the glass to the vinyl sash core.

In addition, further insulation is provided by a dead air space, such as 96, that is defined within the extrusion behind the exterior wooden member. That dead air space, in effect, provides a rectangular insulating portion throughout the sash. If necessary, that air space can be provided with appropriate insulation.

The hinge can be secured to the extrusion by screw 98, which is received in the raised section.

The window assembly is finished by providing an interior head stop member 100 and sill stop 102, which define a groove for receiving a screen. Other finishing members such as 22 and side stop 22a can be provided by the contractor. The vertical section, as shown in FIG. 9, is fundamentally the same as in FIG. 8, except that FIG. 9 is a horizontal view and FIG. 8 is a vertical view. Thus, it can be seen that many of the parts are interchangeable with one another so as to minimize the number of different parts needed in this system.

The window assembly side or jamb finishing members, which cooperate with the head and sill stop members 100 and 102 are generally referred to as side stop members 101 and 103 in FIG. 9.

V. Stationary Window

Figure 10:
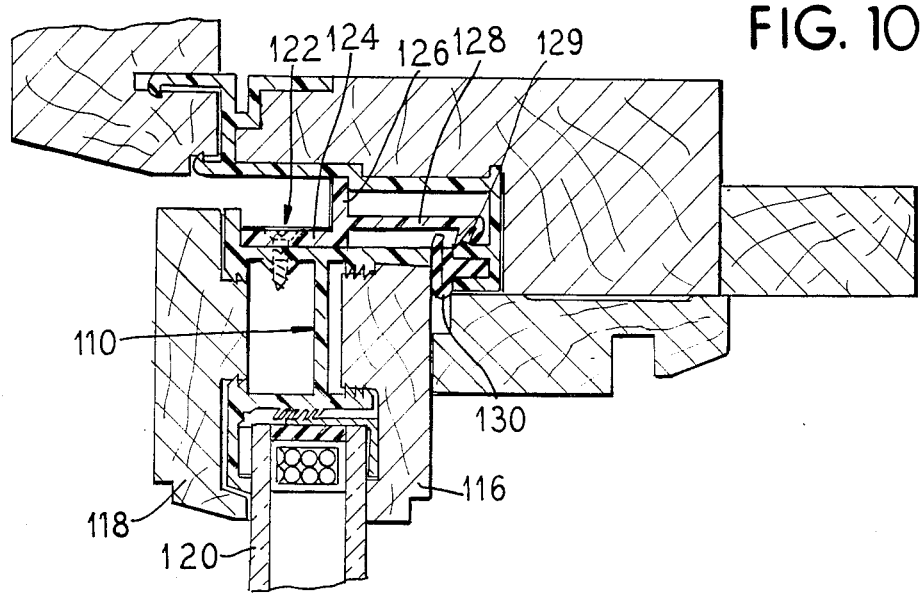
FIG. 10 is a fragmentary vertical section of a stationary or non-movable, glazed sash made in accordance with this invention.

In some situations it is desirable to provide a stationary window system as shown in FIG. 10. In other words, this could be desirable when the sash assembly is not to be movable or openable as with a center window in a three-window placement or a picture window, etc. However, the fundamental concepts of this system are still the same, but are changed only with regard to the requirements to provide a stationary system versus a movable system. Thus the frame-like extrusions as described before are provided and the interior member, exterior member, and the brick moulding or cladding are applied thereto. The fixed window includes the central extrusion or core 110, and the interior members, such as 116, and exterior members, such as 118. The glass member 120 is held in place by the interior and exterior members and the extrusion.

Since the system is stationary, there is provided the fixed sash extrusion 122, which includes the legs 124 and 126 that form a right-angle and inwardly extending leg 128 that terminates in grasping teeth. The extrusion is secured to the sash extrusion by a screw connection, and the leg 126 acts to support the sash in the frame. The leg 128 cooperates with the frame extrusion hook 129. Otherwise, this window construction is similar to prior window constructions.

VI. Alternate Exterior Construction

Figure 11:
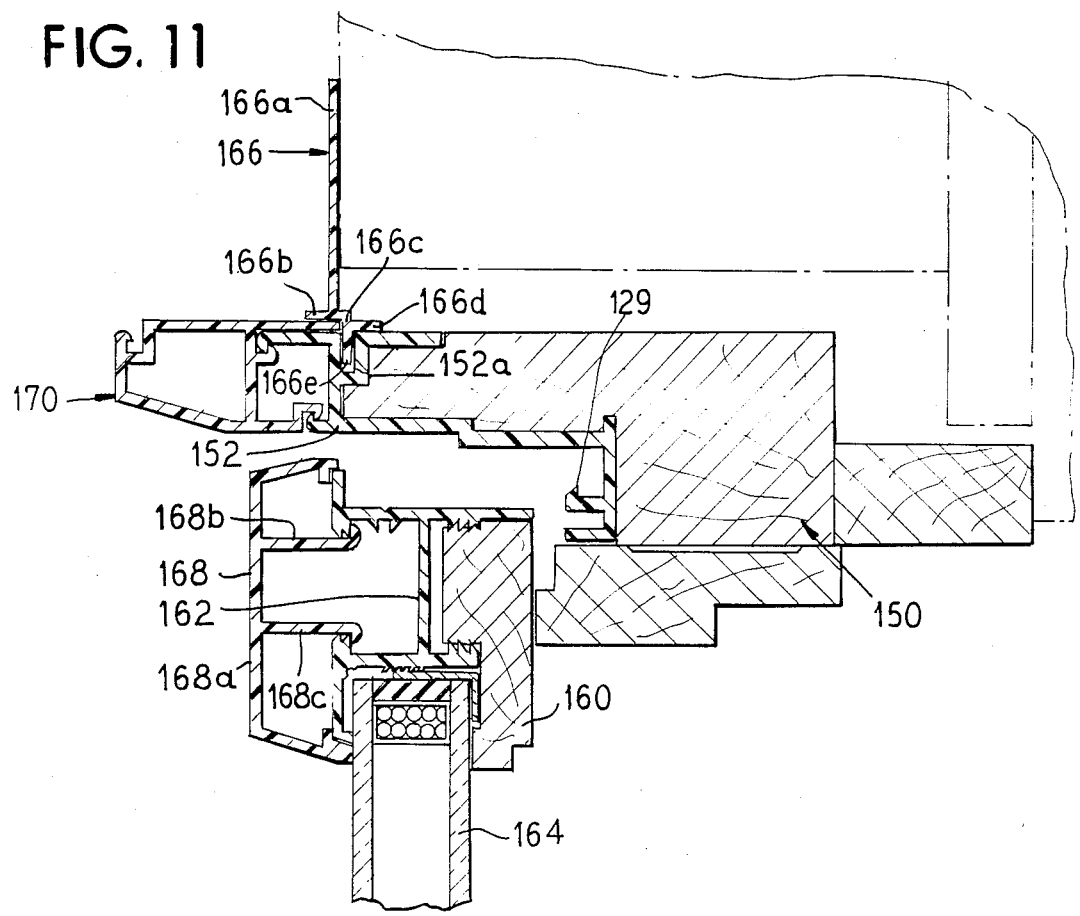
FIG. 11 is a fragmentary vertical section of a clad or alternative mounting frame and sash assembly.

The embodiment shown in FIG. 11 is similar to those shown hereinbefore. There is provided a mounting frame that includes the interior members, such as 150 and core extrusion 152. The sash assembly includes interior members, such as 160, core extrusion 162, and glass 164.

Different than the prior embodiment is the inclusion of the nailing fin 166, which includes the legs 166a, 166b, 166c, and 166d. The leg 166e fits into and cooperates with the groove-like structure 152a in the outer side of the frame extrusion. The leg 166a is elongated, extends from the leg 166b, is to be nailed to the building framing and also closes any gap between the building and mounting frame.

Other differences relate to the construction of the exterior sash members and exterior brick moulding. The exterior extrusion sash member 168 is an aluminum or plastic extrusion being constructed to engage the exterior grasping portion of the sash core 162. More specifically, the exterior member includes an exterior surface 168a and a pair of inwardly extending legs 168b and 168c constructed to snappingly engage the core. Other portions of the exterior member abuttingly engage the core for positioning said exterior member thereon. The exterior frame extrusion member 170 is constructed to snappingly engage the frame as shown. However, since the member 170 is not as large as a regular brick moulding, the nailing fin 166 has been provided.

VII. Ganged Windows

Referring to FIGS. 2 and 7, there are shown a ganged window system 10a. The item of particular relevance is the mullion bar 16a between the windows. The mullion bar 16a is constructed to engage the facing interior window frame core sections of the window frames 12a and 12b. It is seen that the window frame mullion 16a is much like the one previously described brick moulding, but there is also provided a back spacer section 16b which acts to space the two window frames from each other along with the mullion. Insulation 16c is provided between the windows and spacers. The element 16b is positioned behind the mullion 16a, and the mullion is held in position by the frame cores and the head and sill brick mould.

Although the invention has been described with respect to preferred embodiments, it is not to be so limited as changes and modifications can be made which are within the full intended scope of the invention as defined by the appended claims.

I claim as my invention:

1. A fenestration for a building having a fenestration-receiving opening therein, which includes:
   a mounting frame assembly for fitting within the building opening; and
   a glazed sash assembly which fits within the mounting frame and includes a sash and a glazing carried by the sash;
   wherein the improvement comprises:
   said mounting frame having head, sill and side jamb members, each of which includes interior members, exterior members and a shaped extruded plastic core having means for securement to interior member and means for securement to said exterior members;

said sash having head, sill and stile members, each of which includes interior members, exterior members, glazing and a shaped extruded plastic core having means for securement of said interior members thereto, means for securement of said exterior members thereto and means for securement of said glazing thereto; and wherein each of said sash and frame interior and exterior members are selected from a group of members having a plurality of predetermined surface finishes;

said sash core extrusion has an I-beam-like shape which includes a central web, outer exterior and interior flanges, and inner exterior and interior flanges, and said inner exterior flange having an inwardly extending wall formation;

said outer interior flange, web and inner interior flange defining said interior frame receiving portion;

said outer exterior flange, web and inner exterior flange defining said exterior frame receiving portion; and said inner flanges and inwardly extending wall formation defining said glazing receiving portion.

2. A fenestration as in claim 1, wherein at least one of the inner interior and exterior flanges include glazing retaining clip cooperation means, and there is further provided L-shaped glazing retaining means for cooperation with said sash core for retaining said glazing therein, said clip having an L-like shape with one leg adapted to engage said glazing and the other leg having thereon retaining means for securement cooperation with said core cooperation means for retaining said clip in position to hold said glazing in said core.

3. A fenestration as in claim 1, wherein said frame core has an I-beam shape having:
 a web;
 an outer exterior flange;
 an outer interior flange;
 an elongated step-like inner interior flange which terminates in a T-shaped section having a seal carrying section thereon positioned on the exterior facing surface thereof;
 said outer exterior flange, web and inner exterior flange defining an exterior frame component securement section;
 said outer interior flange, web and inner interior flange defining a frame receiving section; and
 a rim-shaped sealing member positioned in said sealing section and constructed to extend about said corners and the ends about at the top thereof so as to define a substantially rectangularly-shaped seal and only a single sealing junction.

4. A fenestration as in claim 3, wherein said exterior members and interior members are selected from plastic members or wooden members.

5. A fenestration as in claim 3, wherein said sash core defines a space about the periphery of the core for use in reducing and controlling thermal conductivity.

6. A fenestration as in claim 5, wherein said core and exterior members define a peripheral chamber.

7. A fenestration as in claim 5, wherein said insulating space is positioned outwardly of said glazing receiving section.

8. A fenestration as in claim 3, wherein there is further provided a sash clip fixedly secured to said sash core and constructed for securement with said frame core, wherein each said sash clip fixedly engages said sash core and releasably engages said frame core.

9. A fenestration as in claim 3, wherein there is further provided an elongated brick moulding means for exterior positioning adjacent a building opening and for securement to the extruded core of the mounting frame so as to conceal the opening required for the fenestration in the building.

10. A fenestration as in claim 3 in which there is provided a second fenestration and thereby a pair of mounting frames, said mounting frames positioned in the building opening adjacent one another and elongated mullion spacer means constructed for positioning between adjacent mounting frames and securement to adjacent core members of each of said mounting frames and for spacing the frames from each other in an amount effective to define substantially equal and consistent spacing between the building opening and side members of the mounting frames adjacent the building.

11. A fenestration as in claim 3, wherein said sash and frame cores are each fabricated of extruded exterior grade rigid plastic.

12. A fenestration as in claim 11, wherein said plastic is vinyl.

13. A fenestration for a building having a fenestration-receiving opening therein, which includes:
 a mounting frame assembly for fitting within the building opening; and
 a glazed sash assembly which fits within the mounting frame and includes a sash and a glazing carried by the sash;
wherein the improvement comprises:
 said mounting frame having head, sill and side jamb members, each of which includes interior members, exterior members and a shaped extruded plastic core having means for securement to interior member and means for securement to said exterior members;
 said sash having head, sill and stile members, each of which includes interior members, exterior members, glazing and a shaped extruded plastic core having means for securement of said interior members thereto, means for securement of said exterior members thereto and means for securement of said glazing thereto; and wherein each of said sash and frame interior and exterior members are selected from a group of members having a plurality of predetermined surface finishes; and
wherein said frame core has an I-beam-like shape having:
 a web;
 an outer exterior flange;
 an outer interior flange;
 an inner exterior flange;
 an elongated step-like inner interior flange which terminates in a T-shaped section having a seal carrying section thereon positioned on the exterior facing surface thereof;
 said outer exterior flange, web and inner exterior flange defining an exterior frame component securement section;
 said outer interior flange, web and inner interior flange defining a frame receiving section; and
 a rim-shaped sealing member positioned in said sealing section and constructed to extend about said corners and the ends about at the top thereof so as to define a substantially rectangularly-shaped seal and only a single sealing junction.

* * * * *